United States Patent [19]

Pees et al.

[11] Patent Number: 4,527,781

[45] Date of Patent: Jul. 9, 1985

[54] PNEUMATIC VEHICLE SUSPENSION UNIT WITH AIR SLEEVE GUIDE

[75] Inventors: James M. Pees; Jerry L. Neubauer, both of Dayton, Ohio

[73] Assignee: General Motors Corporation, Detroit, Mich.

[21] Appl. No.: 521,062

[22] Filed: Aug. 8, 1983

[51] Int. Cl.³ ................................................ F16F 9/08
[52] U.S. Cl. .................................. 267/64.24; 188/315; 92/168
[58] Field of Search .............. 267/64.21, 64.24, 64.26, 267/20 A; 188/315, 322.12; 92/93, 98 D, 168; 308/3.5, 4 R; 280/668

[56] References Cited

U.S. PATENT DOCUMENTS

| 2,988,353 | 6/1961 | Dietrich | 267/64.24 |
| 3,372,919 | 3/1968 | Jackson | 267/64.21 X |
| 3,631,767 | 1/1972 | Meier | 308/4 R X |
| 3,797,816 | 3/1974 | Voss | 267/64.24 |
| 3,954,257 | 5/1976 | Keijzer et al. | 267/64.21 |
| 4,105,193 | 8/1978 | Long, Jr. | 267/64.21 |
| 4,208,075 | 6/1980 | Templeton | 308/4 R |

Primary Examiner—Bruce H. Stoner, Jr.
Assistant Examiner—Robert J. Oberleitner
Attorney, Agent, or Firm—Charles R. White

[57] ABSTRACT

A suspension unit has an elastomer air sleeve associated therewith and a low friction ring-like guide is fitted to the bottom of the dust tube of the unit to guide the air sleeve during operation and to prevent abrasion and wear of the air sleeve by the dust tube.

4 Claims, 3 Drawing Figures

PNEUMATIC VEHICLE SUSPENSION UNIT WITH AIR SLEEVE GUIDE

This invention relates to pneumatic vehicle supsension untis having a new and improved air sleeve guide fitted on the free end of the dust tube thereof which guides the elastomer air sleeve and permits the dust tube to slide against the elastomer air sleeve with minimized wear.

Prior to the present invention, elastomeric air sleeves have been incorporated with hydraulic shock absorbers and suspension struts to provide a pneumatic spring between the sprung and unsprung vehicle components. While such pneumatic air spring units have provided important benefits in vehicle ride, handling and load leveling, air sleeve replacement may be required due to wear of the air sleeve from substantial sliding contact with the steel dust tube.

In accordance with this invention, there is provided a new and improved air sleeve guide that interfits with the dust tube of a shock absorber or strut to reduce direct contact between the elastomeric air sleeve and the dust tube. In the preferred embodiment of this invention, a cylindrical one-piece plastic guide has snap fit connection with the end of the dust tube to present a smooth contact surface for direct engagement with the elastomer air sleeve fro reduced friction between these components. Accordingly with this invention there is improved guidance of the air sleeve and service life of an air adjustable shock absorber or suspension strut units in which it is incorporated.

It is a feature, object and advantage of this invention to provide a new and improved air adjustable vehicle suspension strut or shock absorber having an air sleeve guide attached to the end of the dust tube which prevents abrading or other wear of the elastomer air sleeve by the dust tube during operation of the strut or shock absorber.

Another feature, object and advantage of this invention is to provide a new and improved air sleeve guide in the form of a ring which has snap fit interconnection with the lower end of the cylindrical dust tube of hydraulic damper and extends therearound to prevent contact of the end portions of the dust tube and an elastomer air sleeve for sleeve wear reduction to thereby extend service life.

It is another feature, object and advantage of this invention to provide a new and improved air adjustable shock absorber or strut units fitted with an easily installed guide ring on the end of the dust tube which covers the edges thereof and which presents smooth contact surface for air sleeve guidance and which reduces air sleeve wear.

These and other features, objects and advantages of the invention will become more apparent from the following detailed description and drawing in which.

Figure 1:
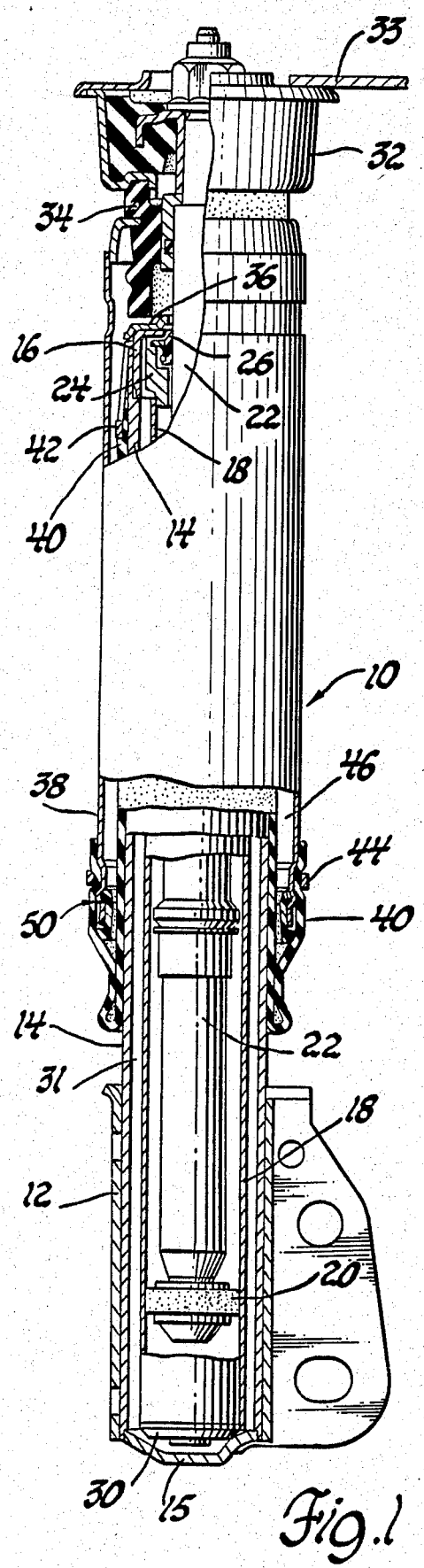
FIG. 1 is a side elevational view with parts in cross-section of a preferred embodiment of this invention.

Turning now in greater detail to the drawings, there is shown in FIG. 1 a suspension strut 10 having a bracket 12 at its lower end adapted to be secured to a road wheel assembly of a vehicle. More particularly, the strut has an elongated outer reservoir tube 14 closed by a lower end cap 15 and secured within the cylindrical socket provided by bracket 12. The reservoir tube 14 extends upwardly from the bracket to a terminal end cap 16 welded or otherwise secured to the uper end of the reservoir tube. The strut contains an elongated oil-filled cylinder tube 18 concentric with the reservoir tube 14 in which a valved piston 20 is slidably mounted. A piston rod 22 attached at its inner end to the piston 20 extends upwardly therefrom through a rod guide 24 mounted on the upper end of the cylinder tube and maintained in position by the end cap 16.

An annular seal 26 is mounted in the rod guide 24 and has annular sealing contact with the piston rod 22 to prevent loss of hydraulic shock absorber oil from the unit as the piston strokes in the cylinder tube during damping operations. A base valve 30 secured to the lower end of the cylinder tube 18 controls the flow of shock absorber oil between the cylinder tube and a reservoir 31 formed between the cylinder tube and the reservoir tube on compression and rebound stroke of the piston for damping spring action. The piston rod 22 extending from the upper end of the damper connects with the upper mount 32 which can be operatively connected to the sheet metal 33 of a mounting tower or other support formed in the body of the vehicle.

A cylindrical jounce bumper 34 of a suitable elastomer material is secured to an upper end of the piston rod immediately below the upper mount 32. In jounce, this bumper is contacted by the bumper plate 36 welded or otherwise secured to the top of the end cap 16. A cylindrical steel dust tube 38 extends from upper attachment with the jounce bumper 34 around the reservoir tube 14.

This strut features an air suspension spring provided by a cylindrical elastomer air sleeve 40 having its inner and upper end connected to the upper end of the reservoir tube 14 by a constricted clamping ring 42. From this clamping ring, the sleeve 40 follows downwardly around the outer periphery of the reservoir tube and is reversely curved intermediate the ends thereof to extend upwardly and around the lower end of the dust tube 38. A second clamping ring 44, similar to clamping ring 42, is employed to secure the sleeve to the lower end of the dust tube in an air tight manner. The pneumatic chamber 46 formed by the dust tube, the reservoir tube, the elastomer air sleeve and other damper components may be charged with a pressurized air to provide a pneumatic spring for vehicle suspension purposes including load leveling. The system for controlling the pressure within the air spring may be based on the system disclosed in U.S. Pat. No. 3,372,919 to G. W. Jackson for Automatic Vehicle Leveling System.

Figure 2:
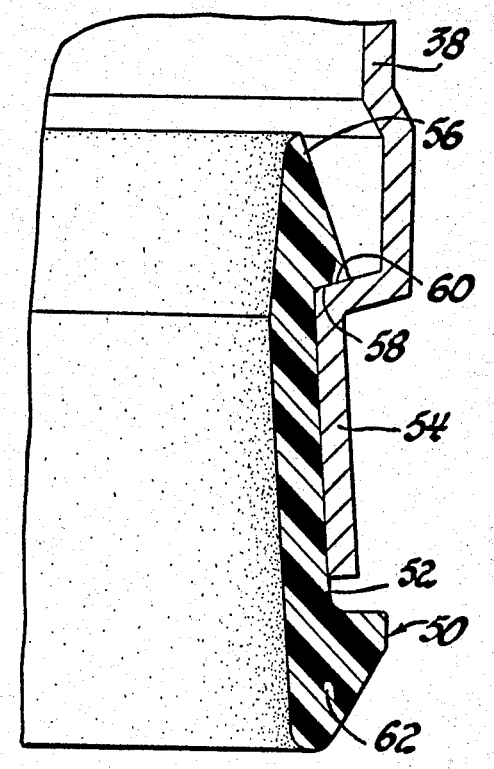
FIG. 2 is an enlargement of a portion of FIG. 1 showing the portion of the dust tube guide and its interfitting relationship with the end of the dust tube of this invention.
Figure 3:
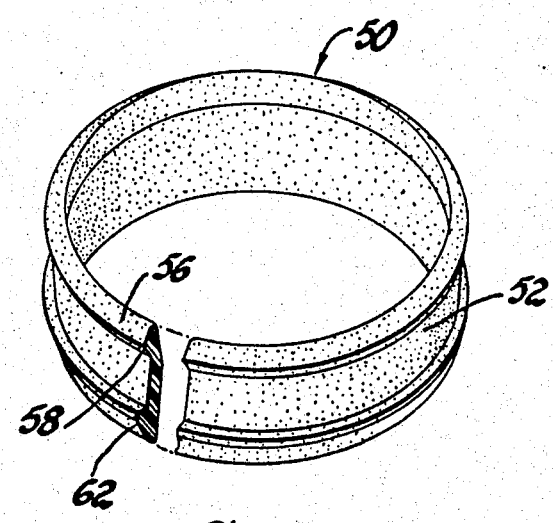
FIG. 3 is an isometric type view of the air sleeve guide of this invention.

There is improved operation of the pneumatic suspension spring and extended service life of the sleeve 40 with the addition of an air sleeve guide 50 which is releasably attached to the lower end of the dust tube 38. This guide is a resilient wide torus or ring of acetal copolymer or other suitable material which has a smooth outer surface and low friction engagement with the elastomeric sleeve 40 to reduce sleeve wear during operation of this strut. The ring-like guide is formed with a centralized external groove 52 which fits into the outwardly coned lower end 54 of the dust tube as shown in FIG. 2. The upper end of the guide has an annular nose portion 56 which fits within the inner diameter of the dust tube to facilitate insertion of the guide into the dust tube. During insertion the nose deflects inwardly out recovers when in position so that the annular radial shoulder 58 engages an internal shoulder 60 immediatley above the lower end of the dust tube to positively retain the guide in place. The lower end of the guide 50 has an enlarged annular contact surface or protuberance 62 that encompasses the terminal edge of the dust tube. Protuberance 62 and other portions of the guide have smooth surface and prevent contact of the air sleeve with portions of the dust tube to reduce air sleeve abrasion or wear during operation. The guide is manually inserted in the end of the dust tube and urged inwardly to effect a snap fit with the guide trapped by shoulder 60. If replacement is necessary, the guide can be readily removed and replaced by a similar shaped guide or with a guide having a different profile.

While a preferred embodiment of the invention has been shown and described, other embodiments will become apparent to those skilled in the art. Accordingly, the scope of this invention is set forth in the following claims.

The embodiments of the invention in which an exclusive property or privilege is claimed are defined as follows:

1. A pneumatic suspension having a hydraulic damper with a cylinder tube having a hydraulic fluid therein, a piston mounted for reciprocating movement in said cylinder tube, a piston rod attached to said piston and extending axially in said cylinder tube and through one end thereof, an outer tube disposed around said cylinder tube, a cylindrical dust tube operatively connected to an outer end portion of said piston rod and extending outwardly of and around a portion of said outer tube and having an outer annular side, a cylindrical air sleeve of elastomeric material having an inner end operatively connected to said outer tube and an outer end operatively connected to said dust tube to form an air adjustable lift spring, first retainer means for sealingly securing the inner end of said sleeve to said outer tube, said sleeve extending alongside of said outer tube and reversely curved between the ends thereof and further extending upwardly around an outer side of said dust tube, second retainer means sealingly securing an upper end of said sleeve to said dust tube, an annular air sleeve guide disposed within the confines of said air sleeve and around the lower end of said dust tube, said guide having a continuous and smooth contact surface to contact said sleeve to reduce wear of said sleeve by said dust tube, and fastener means for releasably fastenting said air sleeve guide ring to the lower end portion of said dust tube.

2. An air adjustable vehicle suspension unit comprising a cylinder tube having a hydraulic fluid therein, a piston mounted for reciprocating movement in said cylinder tube, a piston rod attached to said piston and extending axially in said cylinder tube and through one end thereof, a reservoir tube disposed around said cylinder tube and hydraulically connected thereto to from a reservoir space for said hydraulic fluid, a cylindrical dust tube operativley connected to an outer end portion of said piston rod and extending outwardly of and around said reservoir tube, a cylindrical air sleeve of elastomeric material having an inner end operatively connected to said reservoir tube and an outer end operatiely connected to said dust tube to form an air adjustable lift spring, first retainer means for sealingly securing the inner end of said sleeve to said reservoir tube, said sleeve extending alongside of said reservoir tube and reversely curved between the ends thereof upwardly around an outer side of said dust tube, second retainer means sealingly securing an upper end of said sleeve to said dust tube, an annular air sleeve guide of plastic material disposed within the confines of said air sleeve and around a lower end of said dust tube, said guide having an annular contoured end contact surface disposed below a terminal edge of said dust tube to contact said sleeve to reduce wear of said sleeve by said dust tube, and fastener means for releasably fastening said air sleeve guide ring to the lower end portion of said dust tube.

3. The unit defined in claim 2 wherein said air sleeve guide is torodial and has a centralized annular groove externally formed therein between annular upper and lower protuberances of increased diameters with respect to the diameter of said groove, said lower end of said dust tube being sized to closely fit into said groove so that said guide is retained thereon.

4. The unit defined in claim 3 wherein said lower end of said dust tube has an internal annular shoulder formed therein, and wherein said guide is resilient and deflects when inserted into said lower end of said dust tube and said upper protuberance recovers to an undeflected position to lock onto said internal annular shoulder of said dust tube.

* * * * *

UNITED STATES PATENT AND TRADEMARK OFFICE
CERTIFICATE OF CORRECTION

PATENT NO.   : 4,527,781
DATED        : July 9, 1985
INVENTOR(S)  : James M. Pees, et al It is certified that error appears in the above-identified patent and that said Letters Patent is hereby corrected as shown below:

Column 1, line 2, "unties" should be -- units --.

Column 1, line 28, "fro" should be -- for --.

Column 2, line 6, "uper" should be -- upper --.

Column 4, line 10, "from" should be -- form --.

Signed and Sealed this

Fifth Day of November 1985

[SEAL]

Attest:

DONALD J. QUIGG

Attesting Officer

Commissioner of Patents and Trademarks